United States Patent
Everett

(10) Patent No.: US 6,364,391 B1
(45) Date of Patent: Apr. 2, 2002

(54) MULTI-FUNCTIONAL TAILGATE FOR TRUCK-LIKE VEHICLES

(75) Inventor: Nathan A. Everett, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/681,500

(22) Filed: Apr. 18, 2001

(51) Int. Cl.[7] ............................................... B62D 33/03
(52) U.S. Cl. ..................... 296/51; 296/65.05; 296/57.1; 296/69
(58) Field of Search ........................... 296/26.08, 26.11, 296/37.6, 50, 51, 55, 57.1, 63, 65.03, 65.01, 65.05, 69, 66, 183, 68; 297/14

(56) References Cited

U.S. PATENT DOCUMENTS

| | | | |
|---|---|---|---|
| 2,686,060 A | | 8/1954 | Couse |
| 5,000,504 A | * | 3/1991 | Munguia ............... 296/65.1 X |
| 5,215,346 A | | 6/1993 | Reitzloff et al. |
| 5,338,016 A | | 8/1994 | Howard |
| 5,533,771 A | | 7/1996 | Taylor et al. |
| 5,533,774 A | * | 7/1996 | Cavanaugh ................. 296/66 |
| 5,575,521 A | * | 11/1996 | Speis ......................... 296/57.1 |
| 5,823,595 A | * | 10/1998 | Tronco .................. 296/57.1 X |
| 6,116,676 A | * | 9/2000 | Edwards .............. 296/65.05 X |
| 6,193,294 B1 | * | 2/2001 | Disner et al. .......... 296/57.1 X |
| 6,227,594 B1 | * | 5/2001 | Pommeret .................. 296/57.1 |

* cited by examiner

*Primary Examiner*—Joseph D. Pape
*Assistant Examiner*—Jason Morrow
(74) *Attorney, Agent, or Firm*—Gigette Bejin

(57) ABSTRACT

A horizontal hinged tailgate assembly 7 is provided for a vehicle 10. The tailgate assembly 7 includes a frame 20. A seating platform 60 is provided which is connected to frame 20 and has a seating surface 62. A seat back 64 is included with a first position with a lower end 68 connected to frame 20 adjacent seating platform 60 and an upper end 88 oriented generally vertically upwards. The seat back 64 also has a second table position with the lower end 68 being connected to frame 20 and with seat back 64 extending rearwardly from frame 20.

17 Claims, 4 Drawing Sheets

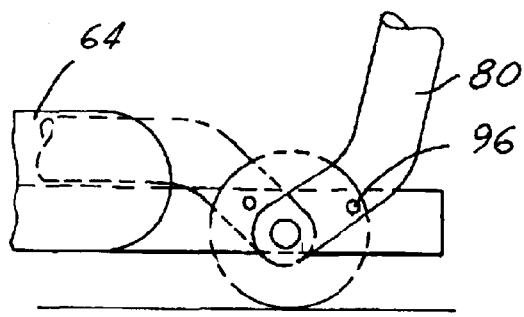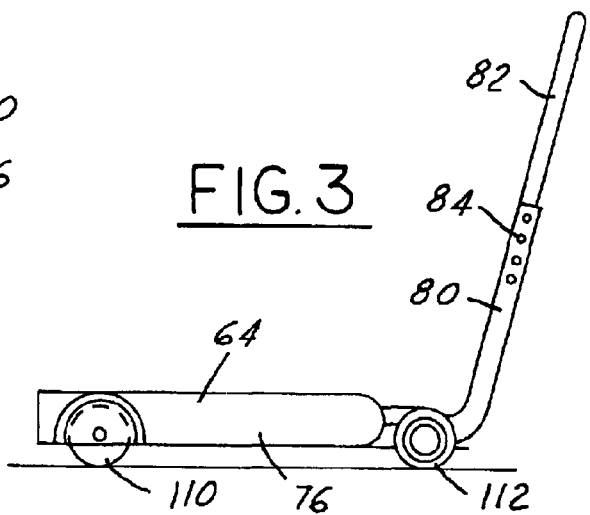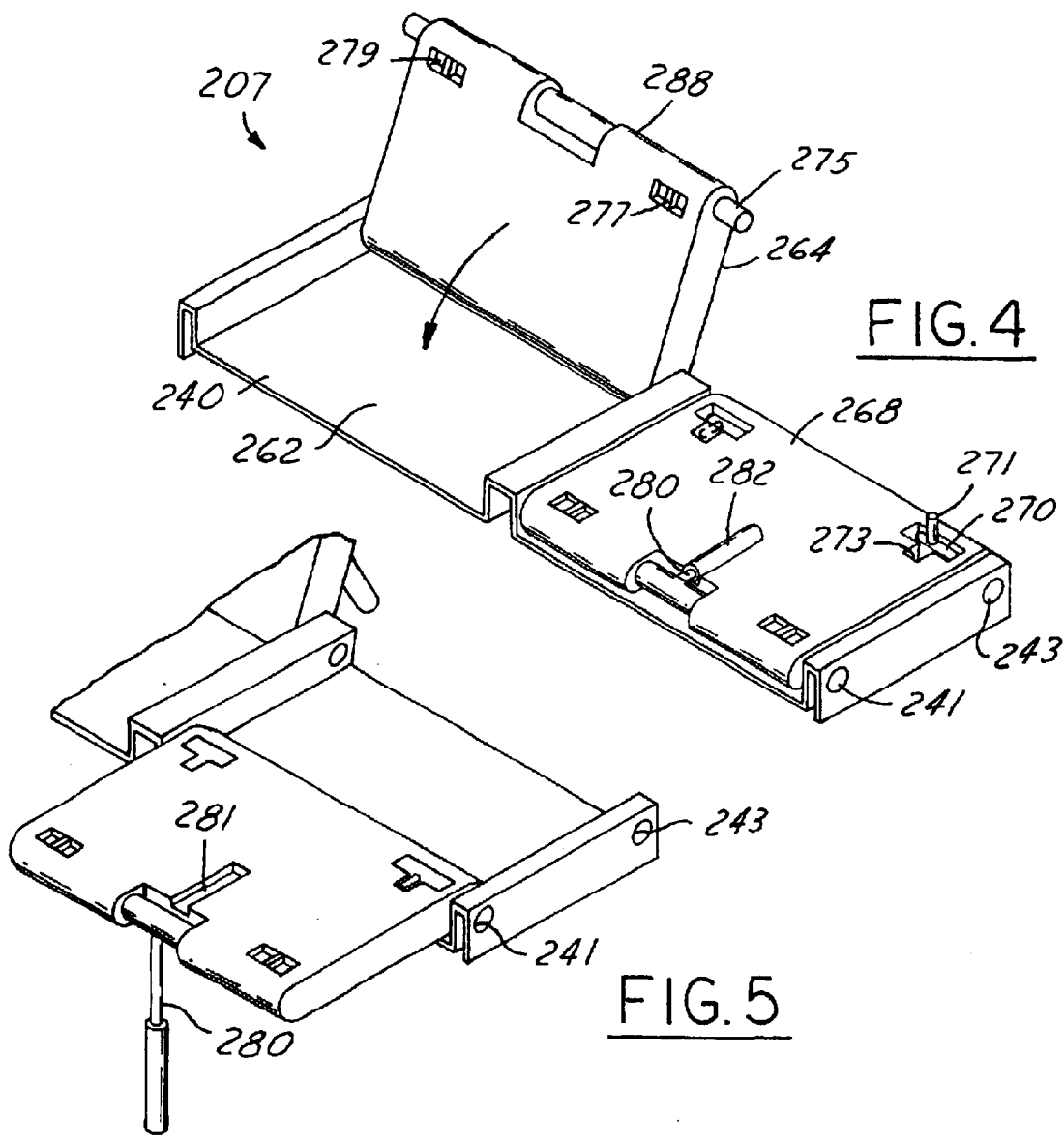

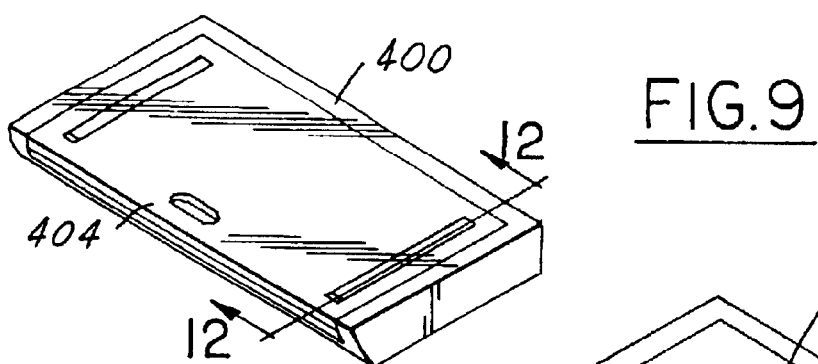
FIG. 9
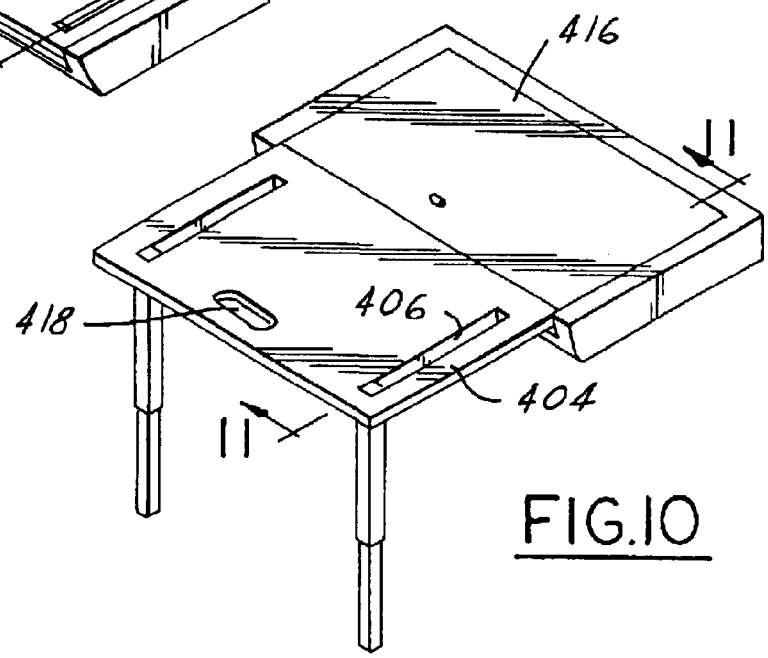
FIG. 10
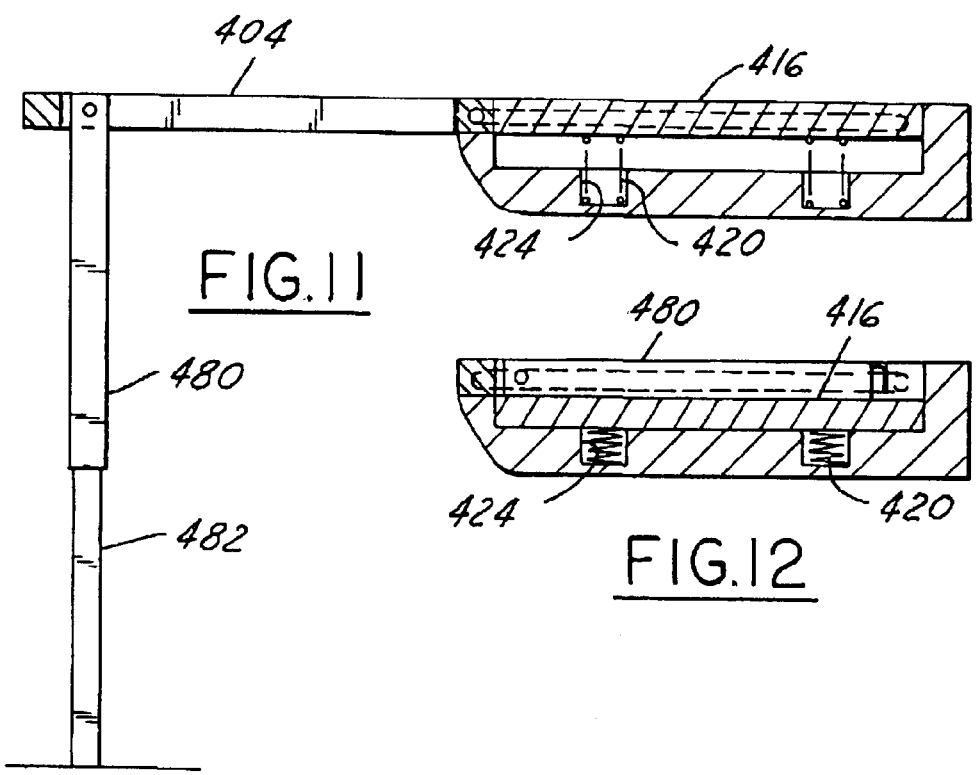
FIG. 11
FIG. 12

US 6,364,391 B1

MULTI-FUNCTIONAL TAILGATE FOR TRUCK-LIKE VEHICLES

BACKGROUND OF INVENTION

The field of the present invention is that of a tailgate assembly for trucks and truck-like vehicles. More particularly, the field of the present invention is that of a tailgate assembly with enhanced capabilities for use as a seat back or a workbench.

In the most recent two decades, there has been a large increase in the sales of light trucks and truck-like vehicles having a bed, such as sport utility vehicles, vans and pick-up trucks (hereinafter sometimes referred to as trucks). Trucks offer major advantages such as a higher seating position, which expands the visual field of the driver. Trucks are multi-functional and can be utilized to move large items such as washers and dryers, household furniture or home building supplies. Many automotive purchasers often prefer trucks due to the additional seating room that they provide, especially pick-up trucks which have extended or twin cabs. An increasing percentage of trucks are sold to non-commercial purchasers. Accordingly, more trucks are being provided with softer suspensions that are more pleasing to non-commercial operators. With the advances of driver comfort into the cabs of many trucks, a greater number are used as transportation on trips of an extended distance. Accordingly, truck use for travel to sporting events, parks and weekend recreational trips has greatly increased.

Most trucks have a rear cargo box with a floor called a bed. The cargo box is closed off at its rear end by a tailgate assembly. The tailgate is typically hinged at its bottom end to the truck along a horizontal axis. In its upper position it closes off the cargo box. In its lower position, the tailgate allows for placement of cargo into the cargo box. Typically in its lower position the tailgate is flush with the bed. During informal social gatherings, it is known to use the tailgate in its lower position for seating or as a table. Accordingly, the term "tailgate party" has come into the nomenclature of popular culture. It is desirable to provide a tailgate assembly for a truck or truck-like vehicle which can enhance its functional capabilities at informal social gatherings for the seating of participants and which can enhance its capabilities as a table or workbench.

SUMMARY OF INVENTION

To make manifest the above noted and other desires, a revelation of the present invention is brought forth. In a preferred embodiment the present invention provides a horizontal axis hinged tailgate assembly for a truck-like vehicle. The tailgate assembly has a generally vertical closed position and a generally horizontally extending open position. The tailgate assembly includes a frame having a lower end for a horizontal hinged connection to the vehicle. The frame has an outer wall.

A seating platform is provided that is connected to the frame which has a seating surface facing opposite the frame outer wall. A seat back is provided having a first position with a lower end pivotally connected with the frame adjacent the seating platform. The seat back has an upper end oriented generally vertically upwards. The seat back has a second table position with its lower end connected to the tailgate and extending rearwardly therefrom. Additionally, the seat back has pivotally connected thereto a U-shaped support. The U-shaped support supports the seat back in the first position. The U-shaped support supports the seat back from the ground in the second table position. The seat back and support can be detached from the frame. The seat back has wheels and when detached can serve as a dolly for moving cargo.

It is an advantage of the present invention to provide a tailgate assembly having enhanced capabilities for seating and extended table capabilities. The above-noted and other advantages of the present invention will become more apparent to those skilled in the art from a review of the invention as is provided in the accompanying drawings and detailed description.

BRIEF DESCRIPTION OF DRAWINGS

FIG. 3 is a view of a portion of the tailgate assembly shown in FIGS. 1 and 2 wherein the seat has been detached from the tailgate assembly and can now be used as a cargo dolly.

FIG. 3a is an enlargement of a portion of FIG. 3 illustrating the pivotable connection of the handle to the seat back shown in FIG. 3.

FIG. 4 is a partial perspective view of a preferred embodiment seat according to the prevent invention shown in its upright position and its lower folded position.

FIG. 5 is a partial perspective view of the tailgate assembly shown in FIG. 4 illustrating the use of the table.

FIG. 9 illustrates a table module of the tailgate assembly shown in FIG. 6.

FIG. 10 illustrates the table module of FIG. 9 in its extended position.

FIG. 11 is a side sectional view taken along lines 11—11 of FIG. 10.

FIG. 12 is a sectional view taken along lines 12—12 of FIG. 9.

DETAILED DESCRIPTION

Figure 1:
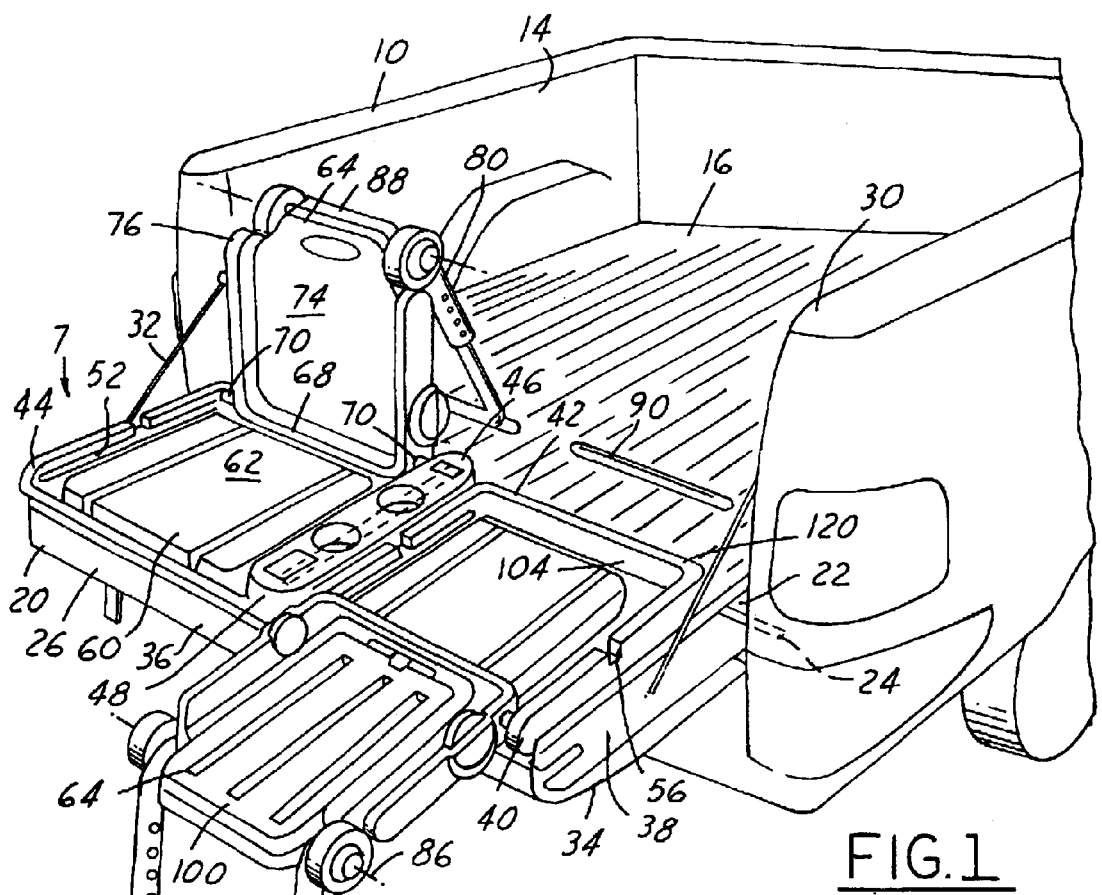
FIG. 1 is a perspective view of a tailgate assembly according to the present invention illustrating an inventive seat provided by the tailgate assembly and also showing a workbench or picnic table additionally provided by the tailgate assembly.

Referring to FIG. 1, a preferred embodiment tailgate assembly 7 according to the present invention is shown in a lowered position. As shown, the tailgate assembly is utilized on a pickup truck 10, however the tailgate assembly 7 is not limited to pickup trucks but can be utilized on other truck-like vehicles such as sport utility vehicles and vans. In its lowered position, the tailgate assembly 7 is generally horizontally extending to allow access to a cargo box 14 having a bed 16. The tailgate assembly 7 has a frame 20. The frame 20 is like most conventional tailgate assembly frames and at its lower end 22 is hingably attached by a pin 24 with the truck 10. When the tailgate assembly 7 is closed, an upper end 26 of the frame 20 will be positioned adjacent a rear upper end 30 of the cargo box 14. To provide additional support for the tailgate assembly 7 when in its lower position, there are cables or links 32.

Frame 20 has an outer wall 34. Tailgate assembly 7 also has a top rim edge 36. The top rim edge 36, the outer wall 34 and a side wall 38 form a spatial envelope. Positioned within the spatial envelope is a module frame 40, which will typically be a stamped metal or premolded polymer structure fixably connected within the spatial envelope of the tailgate assembly 7. The module frame 40 can be one unitary assembly having two halves 42, 44. In alternative embodiments, the module frame is formed as two halves. The module frame 40 will also have a central ridge 46. An outer plastic cover 48 snaps onto the ridge 46 to provide a cupholder function. In still other embodiments the cover 48 can be integral with the module frame 40.

The module frame halves 42, 44 both have linear grooves 52 on both sides. The linear grooves 52 are intersected by an opening slot 56.

The tailgate assembly also has a seating platform 60. The seating platform 60 can be integral with the module frame 40 or for greater comfort can be a padded cushion with a seating surface 62. The seating surface 62 faces opposite the frame outer wall 34. Typically the padded cushion will be a membrane-covered polymeric foam body. The foam body of the seating platform 60 can be joined to the module frame 40 by clips or adhesive, or hook-and-loop type fasteners.

The tailgate assembly 7 additionally has a seatback 64. The seatback 64 has a first position with a lower end 68 connected with the tailgate frame 20 via pivotable connection with the module frame 40. To provide the pivotable connection the seatback 64 has projecting pins 70 which have a tongue and groove connection within the grooves 52. As shown in the left side in FIG. 1 the seatback has a generally upright vertical position and can optionally have a padded foam body that can be similar or identical to the foam body which provides the seating platform 60. The seatback can have additional padding (not shown) to prevent any discomfort from occupant contact with the more rigid portions 76 of the seatback U-shape frame.

The seatback 64 has two supports 80. The supports 80 have a U-shape extension member 82 which can be extended via a conventional spring loaded interlocking pin arrangement 84.

The supports 80 have a pivotable connection along an axis 86 with an upper end 88 of the seatback 64. When the seatback 64 is in its upper position the supports 80 brace and hold the seatback 64 against a detent 90 which is premolded into the truck bed 16 or bed liner.

The grooves 52 at their extreme forward end can have a short portion which drops vertically downward (not shown) to provide a detent function and prevent the pin 70 from popping out when an individual utilizes the tailgate assembly 7 for a seating function.

To retain the support 80 in its angular position there is provided a spring-loaded interlocking pin detent arrangement 96, best shown in FIG. 3A.

The seatback 64 has a second table position, best shown to the right in FIG. 1. In the table position, the seatback 64 can provide additional table space for a social gathering or can serve as a workbench. To assume the workbench position, the seatback 64 is simply moved forward with the pin 70 sliding to an extreme forward position within the grooves 52. The seatback lower end 68 will then be connected to the tailgate frame 20 via the module frame 40 and will extend generally rearwardly therefrom. In the table position as shown in FIG. 1, the U-shaped member 82 can be extended from the supports to allow the seatback 64 to provide a table with the desired inclination from the tailgate frame 20 and the cargo bed 16. Normally, the U-shaped member 82 will be extended fully outward as shown in FIG. 1 to allow the back portion 100 to provide a generally flat table. However, if desired, the support 80 can set inward to allow for an inclined table which may be useful when loading large items into the cargo bed 16.

Figure 2:
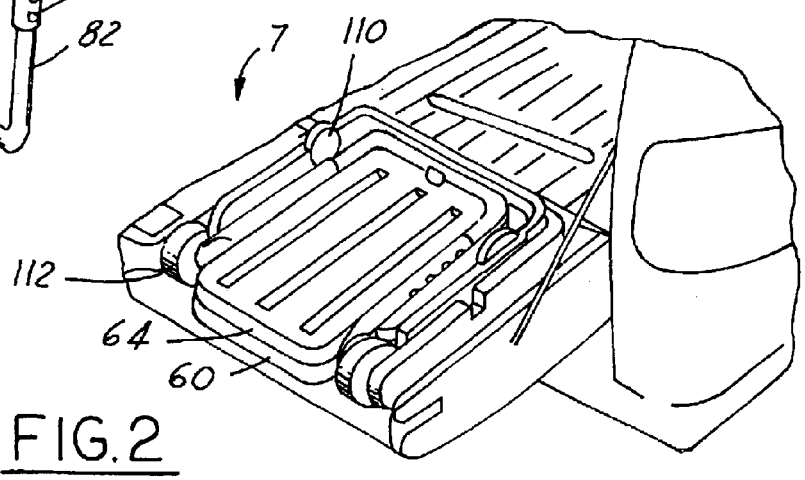
FIG. 2 is a partial perspective view of the tailgate assembly shown in FIG. 1 illustrating the tailgate assembly being fully folded and positioned for regular use.

When the tailgate assembly 7 is utilized during cargo loading, the supports 80 and their U-shaped extensions 82 can be folded over to nest within a U-shaped cavity 104 which is formed between the seating platform 60 and the module frame 40. (FIGS. 1–2.) Referring additionally to FIGS. 3 and 3A, if it is desired to utilize the seatback 64 for a material handling dolly, the seatback extending pins 70 are moved within the parallel grooves 52 to a position to be aligned with the opening slots 56. The seatback 64 can then be detached by being lifted out and set upright upon the ground as shown in FIG. 3. Again, the spring-loaded detent arrangement 96 allows the supports 80 to be positioned in a desired inclination. The seatback 64 general rigid portions 76 have rotatably mounted thereto wheels 110, 112. Wheels 110, 112 provide for rolling movement of the seatback 64 when the seatback is utilizing as a material handling dolly. When the seatback 64 is in the positions shown in FIGS. 1–2, the wheels 110, 112 can aid in loading freight into the cargo bed, especially wide materials such as plywood or drywall. Ideally, the top surface 120 of the module frame should be flush with the bed 16 or the liner placed therein.

Turning now to FIGS. 4 and 5, portions of an alternate preferred embodiment tailgate assembly 207 are shown in partial perspective views. The frame for tailgate assembly 207 is essentially identical to that described for tailgate assembly 7. The module frame 240 is formed in one integral unit which is stamped or molded. The module frame 240 has front and rear apertures 241, 243. A top surface 262 of the module frame 240 provides a seating platform which optionally can be covered with padding (not shown). A seatback 264 is provided. The seatback has pins 270 which have handles 271. The pins 270 can be extended outward to connect the seatback lower end 268 to the module frame 240. To remove the seatback 264 from the module frame, the handle 271 will be moved inward from the position shown in FIG. 4. When the handle is placed within the detent slots 273, the pin 270 is locked in its extended position for pivotal connection with the apertures 241, 243. To support the seatback 264 in the generally vertically extending direction, there is a single center support 280. Support 280 has an extension 282 which can be extended in a spring-loaded pin detent arrangement similar to that described for support 80. In the folded position, the support 280 fits in a nesting groove 281 provided on a rear surface of the seatback 264. The upper end 288 of the seatback 264 has laterally extending pins 275 which can be moved by a pin handle 277 which resides within a slot 279. Since the only function of the pins 275 is to retain the seatback 264 in its folded position shown to the right of FIG. 4, a detent arrangement to ensure the extension of the pins is unnecessary and therefore the pin detent slots 273 are not required. The tailgate assembly 207 will typically be found in vehicles where the potential customer is perceived to be more cost conscious.

Figure 6:
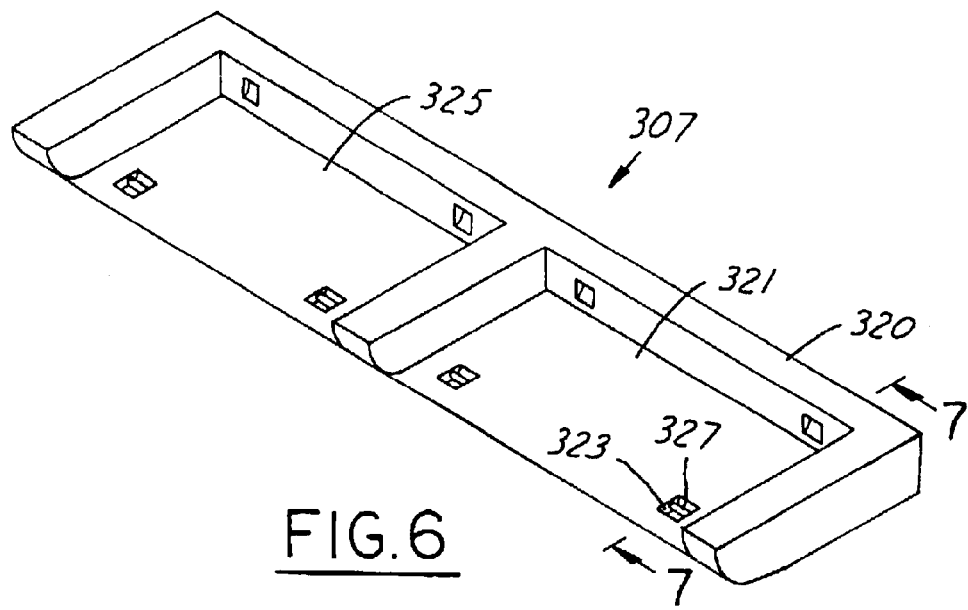
FIG. 6 is a perspective view of a frame of a tailgate assembly of an alternate preferred embodiment.
Figure 7:
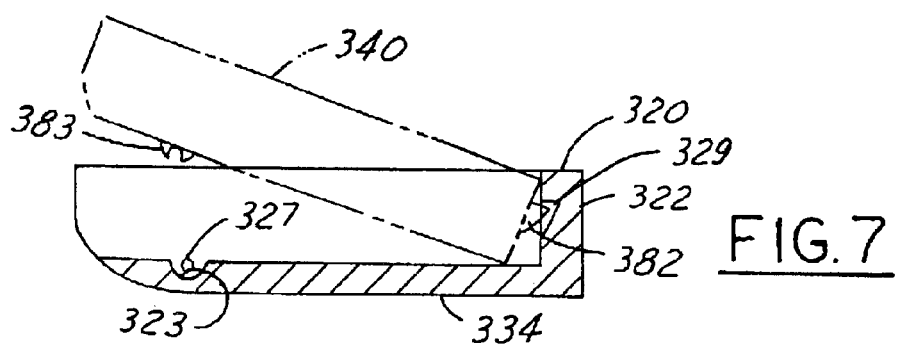
FIG. 7 illustrates the connection of a module into a tailgate assembly taken along lines 7—7 of FIG. 6.
Figure 8:
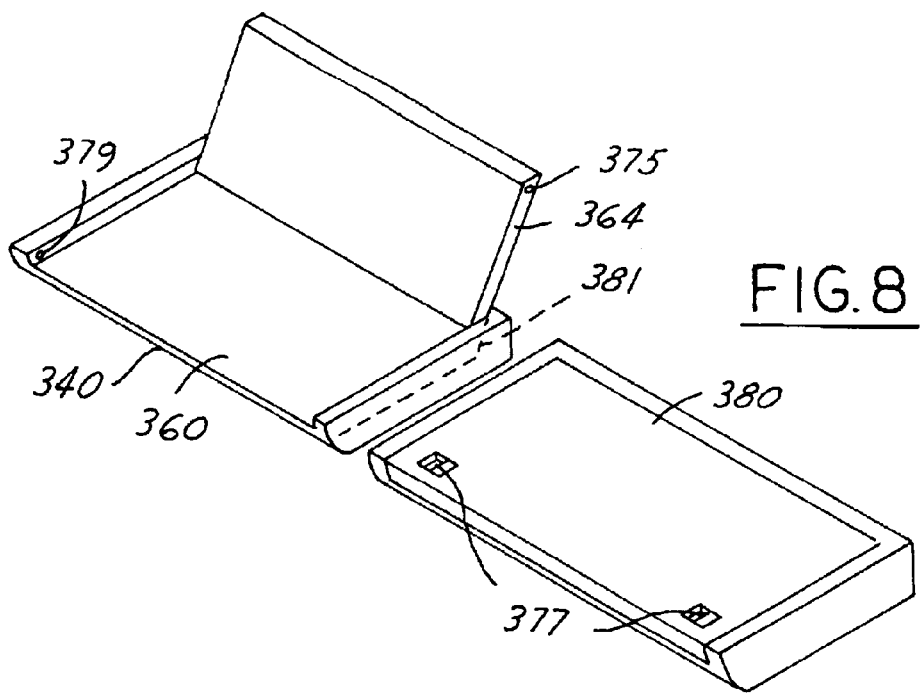
FIG. 8 illustrates a seating module of the tailgate assembly in FIG. 6.

Referring to FIGS. 6–8, an alternate preferred embodiment tailgate assembly 307 is provided with a frame 320. The frame 320 has two nests 321, 325. The tailgate frame 320 has a series of slots 323 which are bridged by pins 327. The tailgate frame has an outer wall 334 and a lower end 322. The lower end has four geometrically spaced pivot lock slots 329.

The tailgate assembly 307 has an option of a seat by insertion of a module 340. Module 340 has a panel which provides a seatback. The seatback panel 364 has an extendable pin 375 which, by use of handles 377, can be extended to lock in its lower position (FIG. 8) by extension through an aperture 379 provided in the module. The module 340 at its rearward end has an inclined surface 381 which supports the seatback panel 364 in its upright position. The module 340 also has a seat platform 360 which can be the module itself or a padded cushion which is fixedly attached (not shown). A top surface 380 of the seatback panel 364 will typically be flush with the truck bed 16. Module 340 will be installed by pivoting the module 340 (FIG. 7) so that a lock stud 382 enters the lock slot 329. A snap fit stud 383 will additionally snap over the pin 327.

FIGS. 9–12 illustrate a module 400 similar to that of module 340. Module 400 has a snap fit stud 383 and a lock stud 382 as previously described (not shown). Module 400 is completely interchangeable with module 340. Module 400 has an upper panel 404 which can be extended to provide a table continuous with the tailgate frame (FIG. 10). Panel 404 has two slots 406 to allow for the pivoted storage of supports 480. The supports 480 have telescoping extensions 482. Extension 482 has a spring-loaded pin retainer arrangement as previously described to allow it to be extended from the support 480.

The table module 400 also has a forward work platform 416. Forward work platform 416 is spring-loaded by springs 420 captured in spring wells 424. Upon the rearward extension of the panel 404, the forward work platform 41 6 will be pushed upward by the springs 420 to provide a workbench or table which can be flush with the truck bed 16. To pull the panel 404 out, or to push it in, there is provided an elongated aperture 418. To restore the panel 404 from its position shown in FIG. 10 to its position shown in FIG. 9, the extensions 482 will be telescoped inside the supports 480. The supports 480 will then be pivoted counterclockwise and the panel 404 will be pushed inward (FIG. 12). A cam interactive surface (not shown) between the panel 404 and work platform 416, can be utilized to force the platform 416 down against the action of the springs or alternatively the work platform 416 can be pushed downward to allow the panel 404 to return to its stored position as shown in FIG. 9.

While preferred embodiments of the present invention have been disclosed, it is to be understood that they have been disclosed by way of example only and that various modifications can be made without departing from the spirit and scope of the invention as it is encompassed by the following claims.

What is claimed is:

1. A horizontal hinged tailgate assembly for a vehicle having a generally vertical closed position and a generally horizontally extending open position, said tailgate assembly comprising:

a frame having a lower end for horizontal hinged connection to said vehicle, said frame having an outer wall;

a seating platform connected with said frame having a seating surface facing opposite said frame outer wall; and a seat back with a first position with a lower end connected with said frame adjacent said seating platform and an upper end oriented generally vertically upwards, said seat back having a second table position with said lower end being connected to said frame and said seat back extending rearwardly therefrom.

2. A tailgate assembly as described in claim 1, wherein there is a support pivotally connected with said seat back to support said seat back on said vehicle in said first position and to support said seat back from a lower support surface when said seat back is in said second table position.

3. A tailgate assembly as described in claim 2 wherein said seat back lower end is pivotally connected to said tailgate assembly in said first and second positions.

4. A tailgate assembly as described in claim 2, wherein said seat back has two supports.

5. A seat back as described in claim 4, wherein said two supports are connected together forming a U-shaped member.

6. A tailgate assembly as described in claim 2, wherein said support is extendable.

7. A tailgate assembly as described in claim 2, wherein said seat back lower end has a tongue and groove connection to said tailgate assembly.

8. A tailgate assembly as described in claim 1, wherein said seat back forms an inner wall for said tailgate assembly and said seat platform is recessed between said seat back and said outer wall of said frame.

9. A tailgate assembly as described in claim 3, wherein said seat back has connected thereto at least a first set of wheels and wherein when detached from said frame said seat back forms a material handling dolly with said support being a handle thereof.

10. A tailgate assembly as described in claim 1, wherein said seat platform and said seat back are connected into said frame in a nest formed in said frame.

11. A horizontally hinged tailgate assembly for a vehicle having a bed, said tailgate assembly having a generally vertical closed position and a generally horizontally extending open position, said tailgate assembly comprising:

a frame having a lower end for horizontal hinged connection to said vehicle, said frame having a nest;

a module for placement within said frame nest, said module having a panel member which can be pivoted to a position to provide a seat back and said module at a rearward end having an inclined surface to support said panel member in said position to provide a seat back, and said module providing a seating platform.

12. A horizontally hinged tailgate assembly for a vehicle having a bed, said tailgate assembly having a generally vertical closed position and a generally horizontally extending open position, said tailgate assembly comprising:

a frame having a lower end for a horizontal hinged connection to a vehicle, said frame having an outer wall and a nest with said frame having a table extendable from said nest for continuous extension rearwardly from a remainder of said tailgate assembly frame.

13. A tailgate assembly as described in claim 12, wherein said table has extendable legs for supporting said table when extended.

14. A tailgate assembly as described in claim 13, wherein said table is provided in a module for insertion into said nest in said frame.

15. A horizontal hinged tailgate assembly for a vehicle having a bed, said tailgate assembly having a generally vertical closed position and a generally horizontally extending open position, said tailgate assembly comprising:

a frame having a lower end for horizontal hinged connection to said vehicle, said frame having an outer wall and at least two nests; and insert modules for selective connection with said frame into said nest, said insert modules being from a group providing a hinged seat back with a seating surface and an extendable workbench surface continuous with said tailgate frame.

16. A tailgate assembly as described in claim 15, wherein said extendable workbench surface has a forward work platform which is spring loaded to be flush with said extendable workbench surface.

17. A horizontal hinged tailgate assembly for a vehicle having a bed, said tailgate assembly having a generally vertical closed position and a generally horizontally extending open position, said tailgate assembly comprising:

a frame having a lower end for horizontal hinged connection to said vehicle, said frame having an outer wall and at least two nests; and insert modules for selective connection with said frame into said nest, said insert modules being from a group providing a hinged seat back with a seating surface and an extendable workbench surface, said extendable workbench surface having a forward work platform which is spring loaded to be flush with said extendable workbench surface.

* * * * *